March 3, 1959 P. W. CRAPUCHETTES 2,876,383

MAGNETRON TUNER

Original Filed Dec. 28, 1950 2 Sheets-Sheet 1

INVENTOR
PAUL W. CRAPUCHETTES
BY R. P. Morris
ATTORNEY

March 3, 1959 P. W. CRAPUCHETTES 2,876,383

MAGNETRON TUNER

Original Filed Dec. 28, 1950 2 Sheets-Sheet 2

INVENTOR
PAUL W. CRAPUCHETTES
BY R. P. Morris
ATTORNEY 2,876,383

MAGNETRON TUNER

Paul W. Crapuchettes, Atherton, County of San Mateo, Calif., assignor to Litton Industries, Inc., San Carlos, Calif., a corporation of California

Continuation of application Serial No. 203,144, December 28, 1950. This application September 9, 1955, Serial No. 533,270

8 Claims. (Cl. 315—39.61)

This invention relates to Magnetron Tuners and more particularly to magnetron tuners of the so called L—C ring type.

This application is a continuation of U. S. application Serial No. 203,144 filed December 28, 1950.

In providing for tuning of magnetrons it has been proposed to vary the tuning by inserting conductive elements into the resonator cavities at positions where the resonators exhibit maximum inductive and capacitive properties respectively. In multiple cavity resonators the inductive control elements and the capacitive control elements are fixed to common rings so that they may be inserted uniformly into all the cavities at once. The rings carrying these elements are referred to as L rings and C rings, respectively, in view of the mathematical symbols generally used to designate inductance and capacity.

In U. S. Patent of C. V. Litton No. 2,512,901 granted June 27, 1950, entitled "Adjustable Magnetron" a combined LC ring tuner is disclosed and claimed. According to this patent the L and C rings are supported in fixed spaced relation with one another, so that as one set of elements is inserted the other is withdrawn by a single control device. Thus as the inductive or capacitive effects of the resonator are increased the other effect is decreased, so that the magnetron may be continuously tuned over a given range.

With development of magnetrons in the centimeter range, particularly at frequencies approaching 5000 to 10,000 megacycles, the construction of combined L—C ring structures of the type described in said patent becomes more difficult. Moreover, any discontinuities arising from the more or less abrupt changes in the L ring and C ring gap cause greater disturbance in tuning at these higher frequencies than at the lower frequency of operation.

Applicant has discovered that smooth tuning of a magnetron over a wide frequency band may be achieved by making a combined L—C ring tuner in which the L and C portions are continuous between the tuning rings.

It is accordingly an object of this invention to provide a combined L—C ring tuner for a multi-cavity resonator magnetron wherein there is provided a plurality of lands and fins shaped so that portions at opposite ends thereof co-operate, upon longitudinal movement, with the predominately inductive and capacitive portions of the resonators, each of the tuning elements being interconnected at its ends to adjacent tuning elements. The intermediate portions of these lands are shaped to provide a gradual transition between the inductive and capacitive effects as the tuning ring is moved.

Preferably the lands are of such a length that together with the interconnections at the ends and the resonator wall intermediate adjacent lands they provide an effective half wave resonator, that is a half wave resonant line above the highest operating frequency as determined by the position of the cavity wall relative to the line.

The above-mentioned and other features and objects of this invention and the manner of attaining them will become more apparent and the invention itself will be best understood by reference to the following description of an embodiment of the invention taken in conjunction with the accompanying drawings, in which.

Figure 1:
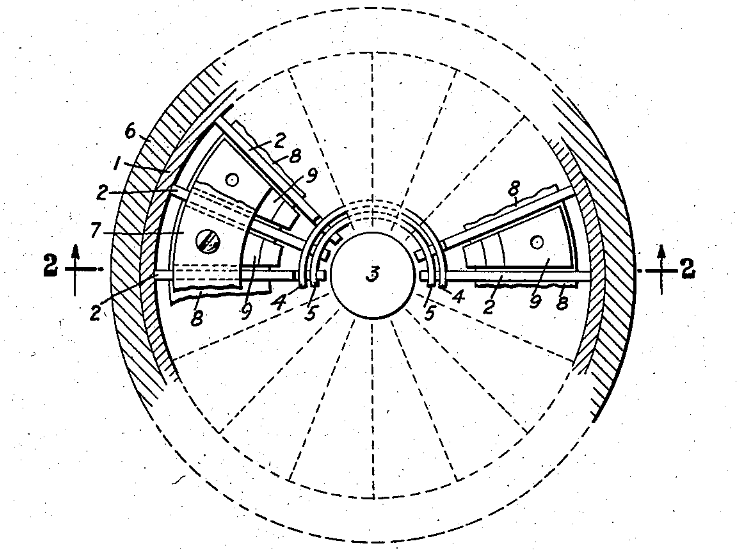
Fig. 1 is a sectional view taken along the line 1—1 of Fig. 2 of a portion of a magnetron embodying the invention.
Figure 2:
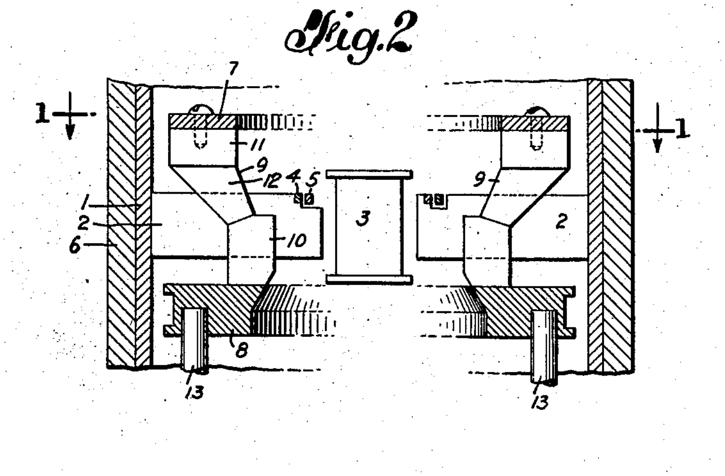
Fig. 2 is a sectional view taken along the line 2—2 of Fig. 1.

Turning first to Figs. 1 and 2 there is shown a portion of a magnetron provided with a tuner arrangement in accordance with this invention. The magnetron may comprise a body portion 1 with a plurality of radial vanes 2 having one end fastened to the body portion 1 and the other end extending inward adjacent to a cathode 3. The vanes 2 together with the body portion 1 serve to define magnetron cavities. As shown herein there are provided sixteen cavity resonators about the cathode 3. The usual strapping means 4 and 5 are illustrated for interconnecting alternate of the vanes for the purpose of maintaining proper mode of operation. The principal magnetron body portion 6 is shown in Fig. 2 arranged outside anode body portion 1.

For the purpose of tuning the magnetron there is provided a pair of rings 7 and 8 interconnected by radially disposed lands 9. The radially disposed lands 9 may be in the form of flat plates or they may be partially sector shaped to fit the resonator cavities as illustrated. Each of the lands 9 comprises a portion 10 which enters in the predominantly capacitive portion of the resonator cavity and another portion 11 which enters in the predominantly inductive portion of the cavity, these two portions being interconnected by a portion 12 which serves as a transition between the predominantly inductive and capacitive tuning portions of these lands. A control means 13 is also provided for longitudinally adjusting rings 7 and 8 together with the lands 9 so as to provide continuous tuning of the magnetron throughout its frequency range. It will be clear that by the proper shaping of the lands and the various portions thereof a relatively smooth tuning throughout the tuning range may be achieved.

Figure 5:
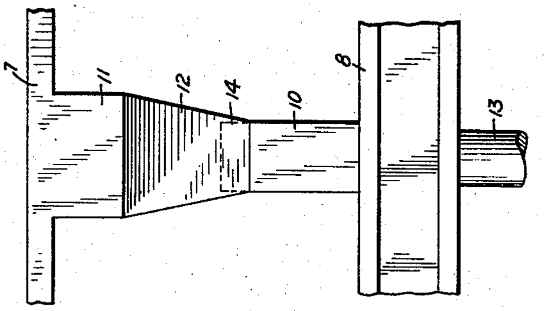
Fig. 5 is a view of the tuning lands of Fig. 3 viewed from the line 5—5.
Figure 3:
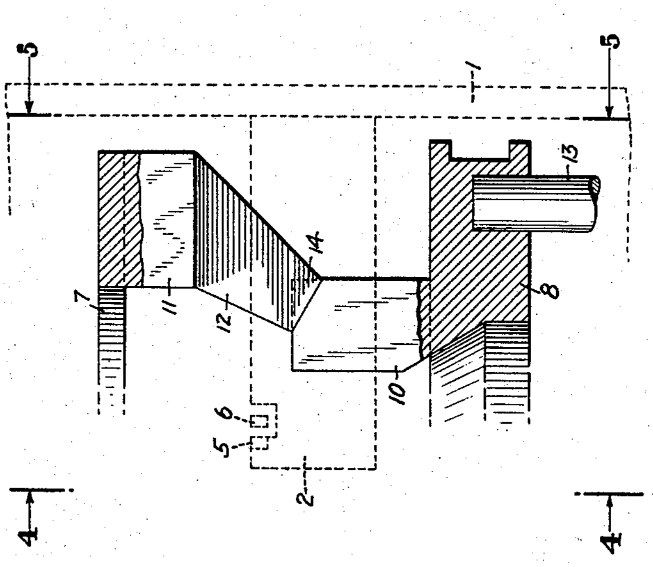
Fig. 3 is an enlarged fragmentary view of a portion of the tuner showing a preferred construction of the lands as used.
Figure 4:
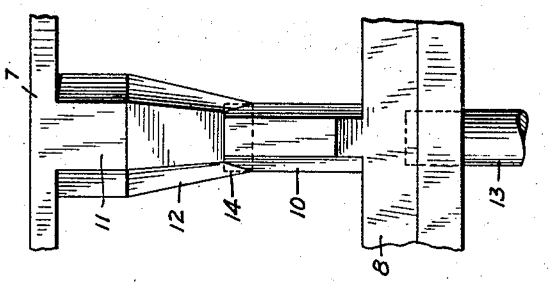
Fig. 4 is a view of the tuning lands of Fig. 3 viewed from the line 4—4.

In a magnetron as actually constructed the combined LC tuning ring has been built with substantially the form illustrated as Figs. 3, 4 and 5. In these figures the rings 7 and 8 are shown each made integrally with a portion of the lands 9. In this arrangement ring 7 is made integral with land portions 11 and 12 and ring 8 made integral with land portions 10. By this construction it is possible to machine out both portions of the lands together with the ring so that easy construction of the arrangement is achieved. Preferably land poritons 10 are made slightly narrower than portion 12 and the end of portion 12 is machined out with a groove as shown at 14 so that these two ring assemblies may be fitted together. A braised or soldered joint is made at groove 14 between the two portions. By this construction the juncture between the two parts of the lands is made at a high impedance point so that any possible irregularity will have very little effect upon the tuning of the magnetron.

Figure 6:
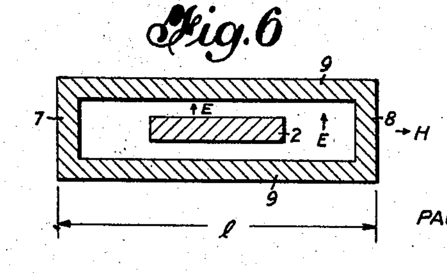
Fig. 6 is a diagram used in an explanation of the operation of the invention.

Turning now to Fig. 6, a diagrammatic showing is made which will tend to illustrate the operation of the tuning ring. As shown therein the two adjacent lands 9 are shown interconnected at their ends by the ring portions 7 and 8. The vane intermediate these two portions is shown as though it were movable lengthwise of the short circuited transmission line section formed by lands 9 and the rings 7 and 8. It may be assumed that the resonator is operating in the normal $\pi$ mode so that the voltage E between the vane and lands will be perpendicular. The length $l$ of this transmission line varies as relative displacement of the vane and the lands is made, so that the adjacent modes of the tuner are varied. It will be seen that each two adjacent lands form in effect a resonant transmission line which will be effectively one half wave length long at the operating frequency. As the relative position of the vanes and the lands is changed the inductance or capacitance of this transmission line is changed so as to vary its resonant frequency and hence its electrical length. By this arrangement it is possible to adjust the resonances of the tuner structure 7, 8 and 9 so that there is no coincidence of resonance with the resonant frequency of the vane system, as tuned by the lands. Thus the tuner does not absorb power from the normally operating magnetron.

It will be realized that the tuning effect of this combined LC tuning ring depends for a large part upon the shaping of the lands interconnecting the two rings. This shaping can be precalculated or may be achieved by cut-and-try methods. In any event, by providing the interconnection portion 12 between the normal L and C ring portions with the gradually increasing cross section toward the inductive or L side of the ring a gradation of tuning between primarily capacitive and primarily inductive tuning control within the magnetron may be provided.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a multi-cavity resonator magnetron provided with a tuner for simultaneously altering the reactive characteristics of said cavity resonators in said magnetron by movement of capacitive and inductive varying elements in the cavities of said resonators, a unitary tuner construction comprising a plurality of lands extending through the cavities of said resonators and interconnected at their ends externally of said resonators, said lands each being shaped so that one end is disposed to extend into the predominantly capacitive portion of said cavity resonators and the other end into the predominantly inductive portion of said cavity resonators the intermediate position between the ends of said lands having varying widths in the direction from the capacitive to the inductive resonator portions, two adjacent ones of said lands being of a length to provide, together with the interconnecting means, a closed circuit resonant above the operating frequency determined by the relative position of said tuner construction with respect to the intervening resonator vanes.

2. In a multi-cavity vane type magnetron provided with cavity resonators each including vanes defining a space therebetween, and a tuner for simultaneously altering the capacitive and inductive reactance characteristics of said cavity resonators in said magnetron by movement of a capacitive varying element into and out of the space between two vanes of said resonators and simultaneously moving an inductive varying element out of and into said space; a unitary tuner construction comprising a plurality of radially disposed lands interconnected at their ends externally of said vanes, said lands having a capacitive portion disposed to extend into the predominantly capacitive portion of said resonator, an inductive portion gradually increasing in width radially of said magnetron disposed to extend into the predominantly inductive portion of said resonator and an intermediate portion linearly tapering on all sides and extending obliquely into said resonator to provide a gradual transition between the capacitive and inductive portions.

3. A magnetron tuner according to claim 2, wherein said lands are shaped in transverse cross-section to provide substantially uniform spacing between the lands and said resonator vanes.

4. A unitary tuner for simultaneously varying the inductive and capacitive characteristics of the cavities of a tunable multi-cavity magnetron, said tuner comprising: a first electrically conductive support ring having a plurality of first lands formed integrally therewith, said first lands being adapted to extend into the predominantly inductive portions on the cavities; a second electrically conductive support ring having a plurality of second lands formed integrally therewith, one second land for each first land, said second lands being adapted to extend into the predominantly capacitive portions of the cavities; and means for electrically and mechanically joining each first land and the associated second land at a point of high electrical impedance.

5. The unitary tuner defined in claim 4, wherein adjacent pairs of said first and second lands and said support rings form an electrical circuit having a resonant frequency remote from the operating frequencies of the magnetron.

6. In a tunable electron discharge device having a cathode and an anode including a plurality of vanes spaced from said cathode, each pair of vanes forming a cavity resonator having first and second ends and relatively high capacitance and inductance regions, a unitary tuner for simultaneously varying the inductance and capacitance of said resonator, said tuner comprising: a first support ring adapted to be positioned adjacent the first end of said resonator; a plurality of first tuning elements formed integrally with said first support ring, one first tuning element for each resonator, each of said first tuning elements being adapted to be positioned in the high capacitance region of its associated resonator; a second support ring adapted to be positioned adjacent the second end of said resonator; a plurality of second tuning elements formed integrally with said second support ring, one second tuning element for each resonator, each of said second tuning elements being adapted to be positioned in the high inductance region of its associated resonator; and means for electrically and mechanically joining each first tuning element and the second tuning element in the associated resonator at a point within said associated resonator.

7. A tunable electron discharge device comprising: a cathode; an anode including a plurality of vanes spaced from said cathode, each pair of adjacent vanes forming a cavity resonator having first and second ends and relatively high inductive and capacitive regions; a plurality of first tuning elements, one for each resonator, each of said first tuning elements being positioned in the capacitive region of its associated resonator; a corresponding plurality of second tuning elements, one for each resonator, each of said second tuning elements being positioned in the inductive region of its associated resonator; means for electrically and mechanically joining each first tuning element and the corresponding second tuning element; a first support ring, positioned externally of said resonator adjacent said first end, supporting said plurality of first tuning elements; a second support ring, positioned externally of said resonator adjacent said second end, supporting said plurality of second tuning elements; and means, mechanically coupled to one of said support rings, for simultaneously moving said rings and said tuning elements thereby to vary simultaneously the inductive and capacitive characteristics of said resonator.

8. The tunable electron discharge device defined in claim 7, wherein each of said support rings is composed of electrically conductive material, and each pair of first and second tuning elements and said support rings form an electrical circuit having a resonant frequency remote from the operating frequencies of the electron discharge device.

References Cited in the file of this patent

UNITED STATES PATENTS

| | | |
|---|---|---|
| 2,424,496 | Nelson | July 22, 1947 |
| 2,481,171 | Spencer | Sept. 6, 1949 |
| 2,495,744 | Litton | Jan. 31, 1950 |
| 2,508,576 | Kusch | May 23, 1950 |
| 2,529,950 | Kather | Nov. 14, 1950 |
| 2,629,068 | Gottschalk | Feb. 17, 1953 |
| 2,800,609 | Litton | July 23, 1957 |